United States Patent
Härkönen et al.

(10) Patent No.: US 9,760,068 B2
(45) Date of Patent: Sep. 12, 2017

(54) PREDICTIVE MAINTENANCE METHOD AND SYSTEM

(71) Applicant: KONECRANES PLC, Hyvinkää (FI)

(72) Inventors: Tuomo Härkönen, Jokela (FI); Henri Luotonen, Hyvinkää (FI); Tuomas Martinkallio, Hyinkää (FI); Marika Pahlman, Helsinki (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 299 days.

(21) Appl. No.: 14/426,065

(22) PCT Filed: Sep. 16, 2013

(86) PCT No.: PCT/FI2013/050893
§ 371 (c)(1),
(2) Date: Mar. 4, 2015

(87) PCT Pub. No.: WO2014/044906
PCT Pub. Date: Mar. 27, 2014

(65) Prior Publication Data
US 2015/0227122 A1    Aug. 13, 2015

(30) Foreign Application Priority Data
Sep. 19, 2012    (FI) .................................... 20125964

(51) Int. Cl.
*B66C 1/00*    (2006.01)
*B66C 13/18*    (2006.01)
(Continued)

(52) U.S. Cl.
CPC ............ *G05B 13/048* (2013.01); *B66C 13/18* (2013.01); *G06Q 10/06* (2013.01)

(58) Field of Classification Search
CPC combination set(s) only.
See application file for complete search history.

(56) References Cited

U.S. PATENT DOCUMENTS 7,440,906 B1 *  10/2008  Wetzer .............. G06Q 10/0631
                                                         705/7.12
7,584,165 B2 *   9/2009  Buchan .................. G06Q 10/06
                                                         706/45
(Continued)

FOREIGN PATENT DOCUMENTS

CN       101185065 A    5/2008
CN       101273316 A    9/2008
(Continued)

OTHER PUBLICATIONS

Ahmad et al. "An overview of time-based and condition-based maintenance in industrial application". Computers & Industrial Engineering, vol. 63, Issue 1, Aug. 2012, pp. 135-149.
(Continued)

*Primary Examiner* — Yonel Beaulieu
(74) *Attorney, Agent, or Firm* — Birch, Stewart, Kolasch & Birch, LLP

(57) ABSTRACT

The invention relates to a predictive maintenance of hoisting equipment (102), particularly cranes. A maintenance center (106) automatically collects diagnostic data relating to least one component of the remote hoisting equipment and optionally sensor data relating the operational environment of the remote hoisting equipment (102). The maintenance center (106) has an access to configuration data of the remote hoisting equipment and the reliability data on the at least one component of the remote hoisting equipment (102). The maintenance center (106) is then able to generate a maintenance plan optimizing the cost of maintenance and reliability of the hoisting equipment over a life cycle of the hoisting equipment.

13 Claims, 6 Drawing Sheets

(51) Int. Cl.
*B66C 13/04* (2006.01)
*G05B 13/04* (2006.01)
*G06Q 10/06* (2012.01)

(56) References Cited

U.S. PATENT DOCUMENTS

| | | | |
|---|---|---|---|
| 7,937,280 B1 | 5/2011 | Leung et al. | |
| 8,788,312 B2* | 7/2014 | Wetzer | G06Q 10/0631 |
| | | | 705/7.26 |
| 2002/0035495 A1* | 3/2002 | Spira | G06Q 10/04 |
| | | | 705/7.36 |
| 2002/0143421 A1 | 10/2002 | Wetzer | |
| 2003/0172002 A1 | 9/2003 | Spira et al. | |
| 2003/0216889 A1 | 11/2003 | Marko et al. | |
| 2007/0078791 A1 | 4/2007 | Vyas et al. | |
| 2007/0279200 A1 | 12/2007 | Morimoto | |
| 2009/0037206 A1 | 2/2009 | Byrne et al. | |
| 2009/0076874 A1 | 3/2009 | Gross et al. | |
| 2011/0282626 A1 | 11/2011 | Rikkola et al. | |
| 2012/0215379 A1 | 8/2012 | Sprock et al. | |

FOREIGN PATENT DOCUMENTS

| | | |
|---|---|---|
| GB | 2367398 A | 4/2002 |
| JP | 2002-297710 A | 10/2002 |
| KR | 20050060245 A | 6/2005 |
| WO | WO 2011/042286 A1 | 4/2011 |

OTHER PUBLICATIONS

Kamran S. Moghaddam "Preventive Maintenance and Replacement Scheduling: Models and Algorithms". University of Louisville, Louisville, Kentucky, USA, Nov. 2008.

Sisa et al. "Depot Maintenance Remote Monitoring Solutions". Impact-RLW Systems, Inc., Jul. 20, 2011.

Thorstensen, T. "Lifetime profit modelling of ageing systems utilising information about technical condition". Theses at NTNU (Norwegian University of Science and Technology), 2008:6.

Chinese Office Action and Search Report, dated May 18, 2017, for Chinese Application No. 201380047741.9, with an English translation of the Chinese Office Action.

* cited by examiner

PREDICTIVE MAINTENANCE METHOD AND SYSTEM

FIELD

The invention relates to a predictive maintenance of hoisting equipment, particularly cranes.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Nowadays, hoisting devices or cranes are widely applied in mechanical, chemical, manufacturing, process, construction and extractive industries, as well as in shipyards or ports and terminals all over the world. An overhead crane, also known as a bridge crane, is a type of crane where the hook-and-line mechanism runs along a horizontal beam that itself runs along two widely separated rails. The hook-and-line mechanism may contain a trolley to move along the horizontal beam, and a hoist arranged to the trolley to lift the items. Often the overhead crane is in a long factory building and runs along rails along the building's two long walls. It is similar to a gantry crane. Overhead cranes typically consist of either a single beam or a double beam construction. These may be built using typical steel beams or a more complex box girder type. Most hoists use some sort of pulley system; pulleys are wheels that are specially designed to guide a rope, cable, belt, or chain, and they are usually mounted on an axle to allow the wheel to spin freely. These pulleys can be mounted to a motor that spins the unit to control the feed of cable. The hoist may be an electric hoist, such as an electric chain hoist, an electric wire rope hoist and an electric belt hoist, using an electric motor as a lifting motor. The hoist equipment may include any of the controls for a motorized pulley unit, the motor electric motor itself, and the pulley housing mounted on the trolley. The controls may include various electric circuitries, such an inverter for controlling the operation of the host, such as speed and direction on the lifting, enabling soft starts and reducing stress forces affecting the crane and the structures.

A good condition of hoisting devices, such as bridge cranes and gantry cranes, is desirable in terms of both economic and security aspects. A fault of a hoisting device e.g. a fault in its brake, may lead to dropping of the load, which may cause damage to the hoisting device and/or danger to personnel working near the hoisting device. During maintenance, the hoisting device is not in productive use. From an economic point of view, the downtime of expensive machinery like the hoisting device should be kept as short and few as possible.

Maintenance of hoisting devices requires highly trained personnel, who may be servicing hoisting devices on a wide geographical area. Since there is only a limited number of capable maintenance personnel, there may be some delay involved between a detection of a maintenance need of a hoisting device, e.g. in case of a fault, and arrival of the maintenance personnel to servicing the hoisting device.

A maintenance plan of a hoisting device includes pre-scheduled maintenances specifying operations to be performed during maintenance. The maintenance plan tries to minimize faults of the hoisting device between the scheduled maintenances and thereby minimizing the downtime.

However, there may still be faults that occur between the scheduled maintenances, therefore requiring more visits by the maintenance personnel and decreasing the uptime of the hoisting device. These faults may be by nature such that they are difficult to detect by the maintenance personnel during the scheduled maintenances. The difficulty may follow from detection of the possible faults requiring a disproportional amount of time to be found, if there is any to be found. Accordingly, the extra time spent during maintenance for detecting faults may have a poor efficiency compared to the cost of the downtime of the hoisting device. The difficulty of detection of the faults may also follow from the faults being impossible to be detected by human eye or by conventional maintenance equipment carried by the maintenance personnel visiting the hoisting device.

An ongoing challenge in crane manufacturing and usage is how to keep crane operation safe during a longer service period with limited maintenance budgets.

BRIEF DESCRIPTION OF EMBODIMENTS

According to an aspect of the invention there is provided a predictive maintenance method of hoisting equipment, particularly a cranes, comprising automatically collecting, at a maintenance centre, diagnostic data relating to least one component of a remote hoisting equipment and optionally sensor data relating the operational environment of the remote hoisting equipment, providing configuration data of the remote hoisting equipment, providing reliability data on said at least one component of the remote hoisting equipment, automatically generating, based on said diagnostic data, configuration data, reliability data and optionally on said operational environment data, a maintenance plan optimizing the cost of maintenance and reliability of the hoisting equipment over a life cycle of the hoisting equipment.

According to an embodiment the automatically generating comprises estimating a reliability and a maintenance cost of the remote hoisting equipment for a plurality of different combinations of maintenance actions and schedules, selecting, among the plurality of combinations, the combination of maintenance actions and schedules that most probably optimizes the cost of maintenance and reliability of the remote hoisting equipment over a life cycle of the remote hoisting equipment.

According to an embodiment the automatically generating comprises utilizing equipment-type specific reliability data maintained based on historian data collected from a plurality of remote equipment of a and utilize the collected information to optimize a local maintenance of individual equipment.

According to an embodiment the selecting comprises selecting the combination of maintenance actions that is estimated provide the best compromise between the cost and reliability or safety.

According to an embodiment, the method comprises, after automatically generating the optimized maintenance plan, manually tuning the maintenance plan.

According to an embodiment, the method comprises maintaining in a database a customer-specific data that include one or more of configuration data of the remote equipment, types of the remote hoisting equipment, types of components of the remote hoisting equipment, customer preferences, designed usage profiles.

According to an embodiment, the method comprises maintaining in a database equipment-type specific data that include parameters, features and/or reliability data for each type of equipment and/or component.

According to an embodiment the collected diagnostic data include operational, usage or condition data from the remote hoisting equipment, preferably one or more of: hoist starts, hoist work cycles, hoist running hours, hoist loading data, hoist over-temperature occurrences, overloads, emergency stops, data on any occurrence where the performance limits of the remote hoisting equipment are exceeded.

According to an embodiment the sensor data relating to the operational environment of the remote hoisting device include one or more of temperature, humidity, corrosion and acceleration.

According to an embodiment sensor data relating the operational environment of the remote hoisting equipment comprises data of external shocks to and collisions of the apparatus, acceleration being preferably measured in three dimensions measured in x, y and z directions of a Cartesian coordinate axes.

According to an embodiment sensor data relating the operational environment of the remote hoisting equipment comprises data representing a corrosive effect of the environment on electrical devices of the apparatus.

According to an embodiment, the method comprises taking the operational environment data into account in estimating the reliability of the remote hoisting equipment, at least if operation in an abnormal environment is observed.

Another aspect of the invention is a maintenance system comprising means configured to perform a method according to the first aspect of the invention.

According to an embodiment, the system comprises at least one computer and at least one memory including computer program code, the at least one memory and the computer program code configured to, with the at least computer, cause the apparatus at least to perform the method according to a method according to the first aspect of the invention.

A further aspect of the invention is a computer program comprising executable code that when executed, cause execution of functions of a method according to the first aspect of the invention.

BRIEF DESCRIPTION OF THE DRAWINGS

In the following the invention will be described in greater detail by means of exemplary embodiments with reference to the attached drawings, in which.

DETAILED DESCRIPTION OF EXEMPLARY EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

An aspect of the invention is to provide an automatically optimized equipment-specific predictive maintenance scheme aiming to have decreased life cycle costs as well as increased reliability and safety. The predictive maintenance scheme may be a self-learning scheme in which learning of the optimization is based on information provided by a plurality (e.g. an entire fleet) of equipment, such that the provided information is utilized to optimize the maintenance of individual equipment. This enables a more accurate prediction for the life cycle of the equipment already at the time of sale or at beginning of the life cycle. It may be said that now the predictive maintenance is considered from the maintenance service provider's point of view. The maintenance service provider is able to gather information and experience from a larger number of equipment and utilize the collected information to optimize a local maintenance of individual equipment. Traditionally, the predictive maintenance and the right-time realization of the maintenance has been considered from the plant operator point of view and the aim has been to optimize a specific limited entity (plant operator's equipment). Embodiments of the invention may further allow generating theoretical reliability analysis for a specific moment of time.

An aspect is to provide an automatically optimized equipment-specific predictive maintenance system to which customer-specific information is inputted and which automatically utilizes equipment-specific information collected from a plurality of equipment (e.g. an entire equipment fleet) to generate an optimized maintenance plan.

An optimized maintenance plan includes pre-scheduled maintenances specifying operations to be performed during maintenance over an extended period of time, preferably over the life cycle of the equipment.

Figure 1:
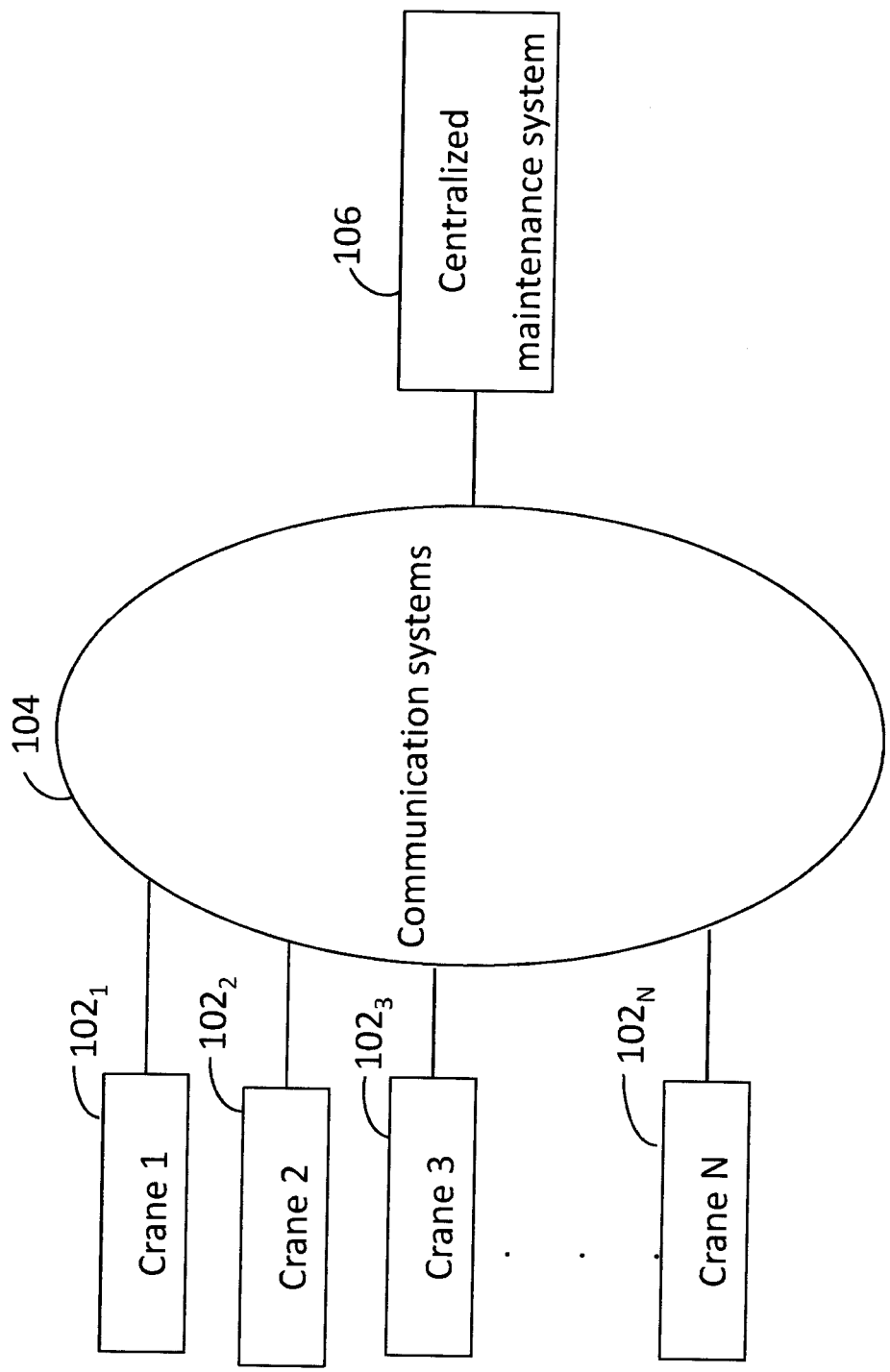
FIG. 1 illustrates an example of an automatically optimized equipment-specific predictive maintenance concept according to an embodiment.

FIG. 1 illustrates an example of an automatically optimized equipment-specific predictive maintenance concept according to an embodiment. A centralized maintenance system 106 is preferably operated by a maintenance service provider. The centralized maintenance system 106 may be arranged to communicate with a plurality of equipment $102_1$, $102_2$, $102_3$, ..., $102_N$ over communication system(s) 104. The equipment $102_1$, $102_2$, $102_3$, ..., $102_N$ may be located at premises of a plurality of maintenance customers in operation or waiting for installation or transportation, or being transported to the customer premises. The customer premises may include mechanical, chemical, manufacturing, process, construction and extractive plants or factories, as well as shipyards or ports and terminals all over the world. The communication system(s) may include any communication system or any combination of communication systems that enables data to be transmitted from the equipment $102_1$, $102_2$, $102_3$, ..., $102_N$ to the centralized maintenance.

The plurality of equipment, also referred to as a fleet of equipment $102_1$, $102_2$, $102_3$, ..., $102_N$ may, at least primarily, include hoisting devices, such as cranes 1 ... N. Examples of different type of cranes include an overhead crane, a bridge crane, a gantry crane, a tower crane, and a harbour crane. However, the plurality of equipment may additionally include other equipment as well, such as machine tools.

Figure 2:
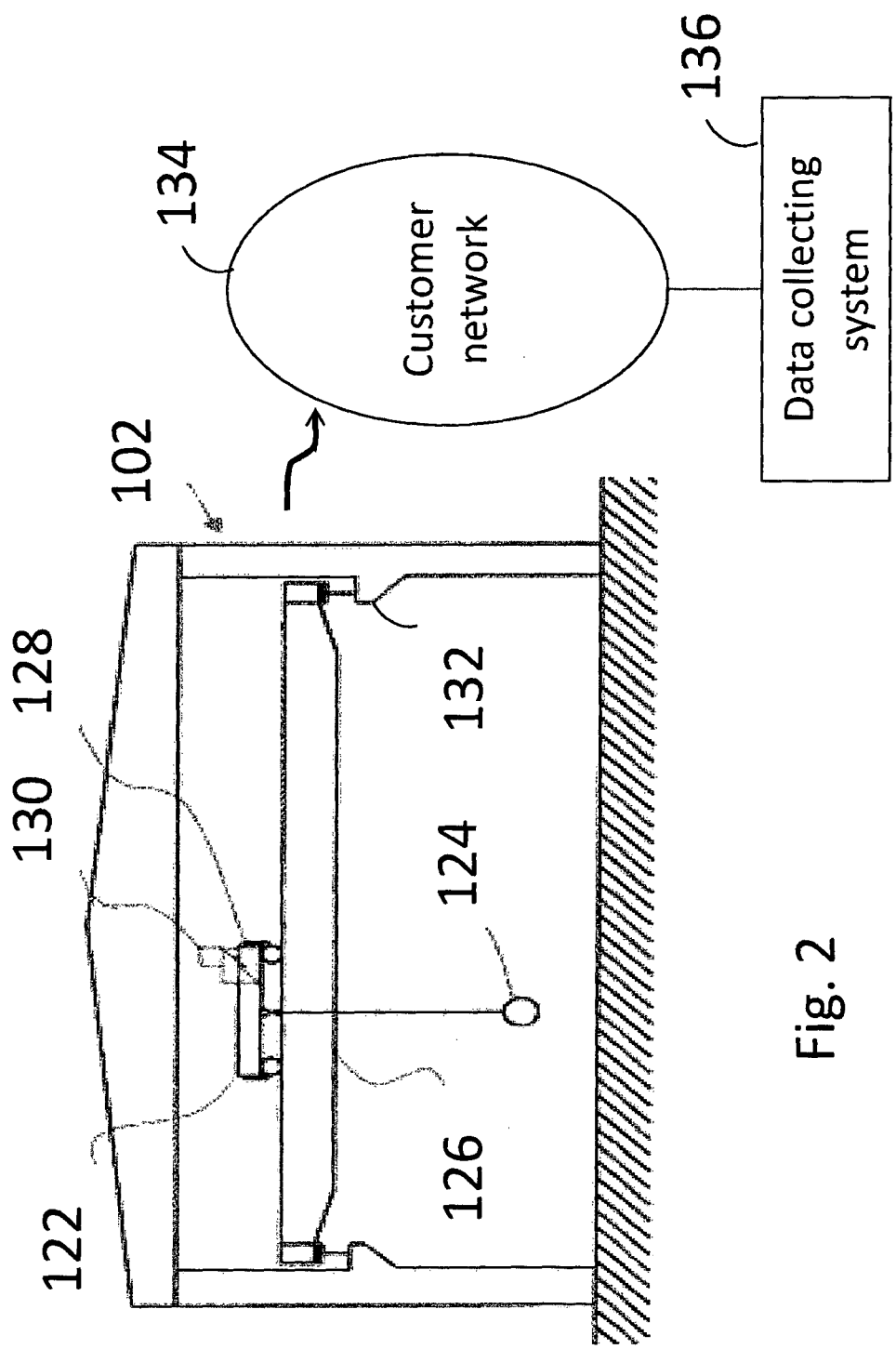
FIG. 2 illustrates an example of an overhead crane.

As an example of equipment $102_1$, $102_2$, $102_3$, ..., $102_N$, an exemplary overhead crane illustrated in FIG. 2. An overhead crane 102, also known as a bridge crane, is a type of crane where the hook-and-line mechanism 122, 124, 128 runs along a horizontal beam 126 that itself runs along two widely separated rails 132. The hook-and-line mechanism may contain a trolley 122 to move along the horizontal beam 126, and a hoist 124,128 arranged to the trolley 122 to lift the items. Often the overhead crane is in a long factory building and runs along rails 132 along the building's two long walls. It is similar to a gantry crane. Overhead cranes typically consist of either a single beam or a double beam construction 126. These may be built using typical steel beams or a more complex box girder type. Most hoists 124,126 use some sort of pulley system; pulleys are wheels that are specially designed to guide a rope, cable, belt, or chain, and they are usually mounted on an axle to allow the wheel to spin freely. These pulleys can be mounted to a motor that spins the unit to control the feed of cable. The hoist may be an electric hoist, such as an electric chain hoist, an electric wire rope hoist and an electric belt hoist, using an electric motor as a lifting motor. The hoist equipment 128 may include any of the controls for a motorized pulley unit, the motor electric motor itself, and the pulley housing mounted on the trolley. The controls may include various electric circuitries, such an inverter for controlling the operation of the host, such as speed and direction on the lifting, enabling soft starts and reducing stress forces affecting the crane and the structures. The hoist may also be provided with sensors gathering data diagnostics data of component of the crane, and optionally data relating the operational environment of the crane. There are many obvious ways for the crane equipment 102 may communicate the data to the centralized maintenance system 106 over the communication system(s) 104, as discussed above with reference to FIG. 1. In FIG. 2, an example embodiment is illustrated, wherein the hoist 128 may communicate using a local customer network 134, such as a wired or wireless local area network (LAN). The customer network 134 may provide an access network to the Internet or any other data communication network. A local data collecting system or unit 136 may be provided to collect the diagnostic and optionally the environmental data, and send the data, possibly after pre-processing, to the centralized maintenance system 106. There may be a primary fixed connection and a secondary wireless connection (i.e. 3G, GPRS or satellite), attached to the crane 102 for transferring the information to the centralized maintenance system. A secure connection, such as VPN connection, may preferably be used between the crane 102 or data collecting system 136 and the centralized maintenance system 106.

The collected diagnostic data may include any operational, usage or condition data from the crane 102. For example, the collected data may include one or more of: hoist starts (periodic and/or cumulative), hoist work cycles (periodic and/or cumulative), hoist running hours (periodic and/or cumulative), hoist loading data, hoist over-temperature occurrences (periodic and/or cumulative), overloads (periodic and/or cumulative), emergency stops (periodic and/or cumulative), data on any occurrences where the performance limits of the crane are exceeded, information on the vibration, acceleration, speed or displacement of the hoist, etc. This may be provided by a control part of the host together with various sensors which relate to the control of the crane. Examples of such sensors include overheating sensors of an electric motor, and acceleration sensors used for the load motion control of the hoist. Also sensors not directly related to the control of the crane may be provided. An example of such sensors is an environmental sensor 128 arranged to monitor an environment of the crane. The life time and maintenance need of the crane, especially the electrical unit of the host, is greatly affected by the environment of the crane. Accordingly, measurement of one or more characteristics of the environment by the sensor located at the electrical unit provides for determining the expected lifetime and maintenance need in the actual environment of the crane. Examples of an environmental sensor 128 include a temperature sensor, a humidity sensor, a corrosion sensor, an accelerometer, and any combination thereof. Temperature, humidity and corrosion characteristic of the environment have a significant effect on the reliability and lifetime of electric parts. An accelerator may monitor external shocks and impacts to the crane that cause damages that shorten the lifetime of mechanical and/or electrical components of the crane. Each of the monitored environmental parameters may be defined by a range. The parameters may be measured within the range and/or outside the range. When measuring a parameter within the range, information may be obtained of the operating environment meeting the instructions of use of the crane. On the other hand, when a parameter is measured outside the range, information may be obtained of the crane not meeting the instructions of use and/or the crane operating in an exceptional environment, i.e. in an environment defining an irregular use of the crane. In the latter cases, the special environment can be taken into account in predicting the maintenance needs. For more detailed description of an environmental sensor arrangement a co-pending patent application FI20125829 filed by the same applicant is incorporated by a reference herein.

Figure 3:
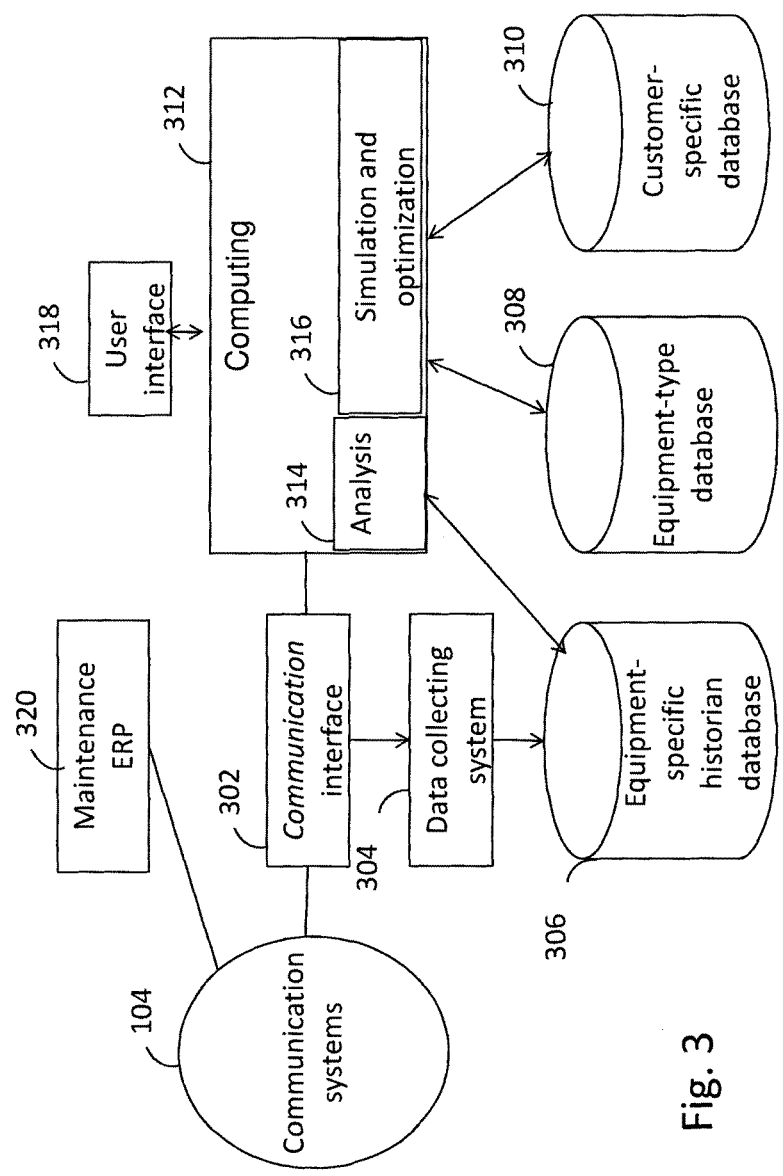
FIG. 3 illustrates an example of a centralized maintenance system 106 according to an embodiment.

FIG. 3 illustrates an example of a centralized maintenance system 106 according to an embodiment. A centralized maintenance system 106 is preferably operated by a maintenance service provider. The centralized maintenance system 106 may be provided with a communication interface 302 arranged to communicate with a plurality of equipment $102_1, 102_2, 102_3, \ldots, 102_N$, and optionally with any other data system, over communication system(s) 104. The communication interface 106 may represent any device(s) and functionalities that may be used for communication in each specific application. Data received from the plurality of equipment $102_1, 102_2, 102_3, \ldots, 102_N$ may be collected to an equipment-specific historian database 306. The database 306 may contain for each specific equipment usage, diagnostic and/or environment data collected over a prolonged period of time, preferably over the entire lifecycle of the equipment. A data collecting system 304 shown in FIG. 3 may generally represent any device(s) and functionalities that may be used in the data collection.

The centralized maintenance system 106 may further include a customer-specific database 310 that may contain configuration data of the equipment, customer preferences, designed usage profiles, etc. for each customer. The configuration data may include the type of the equipment and the components thereof. The centralized maintenance system 106 may still further include an equipment-type database 308 that contain parameters and features of each type of equipment. For example, the database 308 may contain reliability data for each type of equipment and/or component thereof. Reliability is a feature which characterises the ability to perform, within specified limitations, required functions with failure-free operation, durability, maintainability, storage ability and transportability, or combination of these features. There are several well-known measures for reliability. For example, Mean time to failure (MTTF) indicates an average time until a failure of a system or device occurs. MTTF can be estimated by the total time in service of a population of similar items divided by the total number of failures within that population. Mean time between failures (MTBF) can be estimated by the total working time divided by the number of failures within population of similar items. There may be repairs or maintenance actions between consecutive working periods. Failure rate indicates the probability of failure per time unit. It is the rate of occurrence of failures. As a further alternative, a distribution or probability function may be utilized to indicate the probable time until failure or between failures. Cranes can be seen as series systems that consist of independent parts or components with different lifespans and reliabilities. A main characteristic of a series system is that if any subsystem or component does not work properly, it results in loss of function of the whole system. Thus, reliability data may be provided for individual components of the cranes. The reliability data may also be provided for different environmental data, i.e. correlation of reliability with environment may be indicated. It should be appreciated that the databases 306, 308 and 310 may implemented in individual databases, virtual databases, a single unitary database, distributed databases, any combination thereof, or in any other database architecture suitable for a specific application.

The centralized management system 106 may further include a computing system 312 configured to perform analysis of the collected and stored information, to perform simulations, and to perform optimization of the predictive maintenance. The computing system 312 may be implemented with any type of computing architecture, such as in a single computer or in a distributed computer system.

Figure 6:
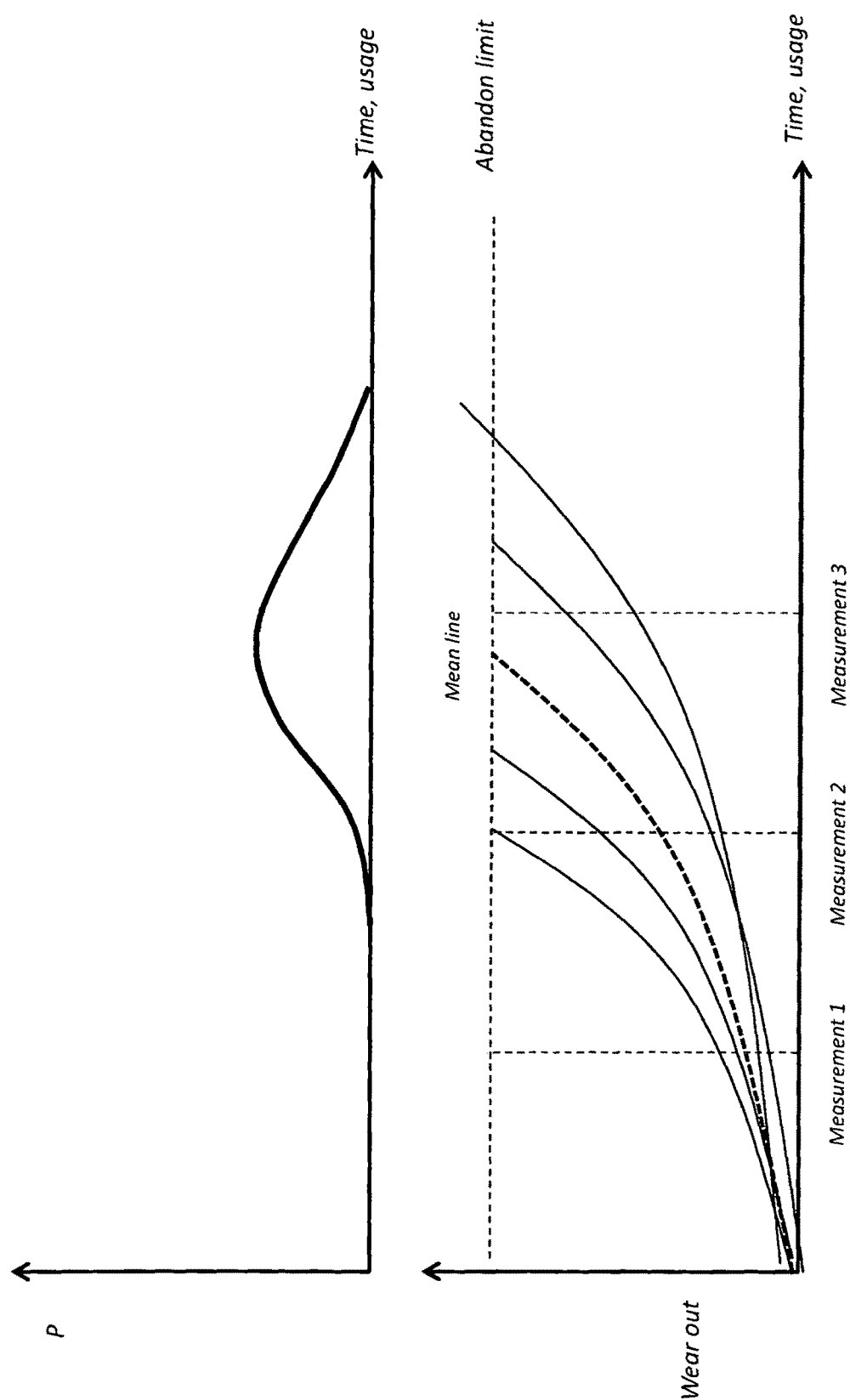
FIG. 6 illustrates updating of reliability data.

The analysis section 314 may be configured to analyse and process the equipment-specific usage, diagnostic and/or environment data in the database 306, as well as the equipment-type data in the database 308 and the customer-specific data in the database 310. The analysis section 314 may retrieve the data from the database 306 to compile that information into a customer report that is available for the customer and/or the maintenance personnel in real-time. Thereby, safety is increased as overloads, emergency stops and other safety issues can be captured and clearly brought to customer's and maintenance personnel's attention. Still further, the analysis section 314 may analyse and detect failures of the equipment and/or components, and generate alarms to the customer and/or the maintenance personnel. The analysis section 314 may also receive information on the detected failures and/or performed maintenance actions from customer database 310 or other sources. The analysis section 314 may update the reliability data of different type of equipment and components in the equipment-type database based on the collected history data, detected failures and the performed maintenance actions. More generally, the reliability data and/or maintenance need data for different type of equipment and components may be updated based on information provided by a plurality (e.g. an entire fleet) of equipment, such that the provided information can be utilized to predict and optimize the maintenance of individual equipment. In other words, the maintenance service provider is able to gather information and experience from a larger number of equipment and utilize the collected information to optimize a local maintenance of individual equipment. The effect of updating is illustrated in FIG. 6. A plurality of measurements 1 . . . N is obtained on the usage time until wear out (failure) of a component. On the basis the plurality of measurements, a mean usage time and a probability function of the usage time can be determined. The more measurements we have, the more accurate mean usage time and the more accurate probability function are obtained.

Figure 4:
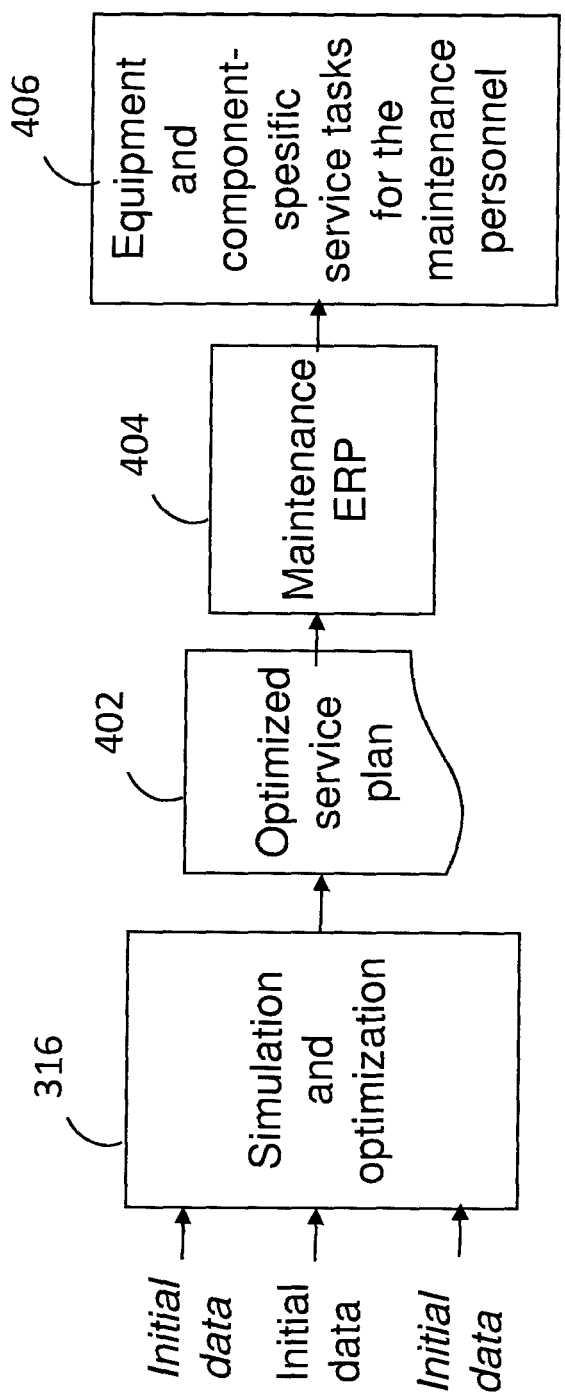
FIG. 4 is a flow diagram that illustrates an example of providing a service or maintenance plan.

FIG. 4 is a flow diagram that illustrates an example of providing a service or maintenance plan which is optimized for specific equipment and specific customer. The maintenance plan/program may take into account following considerations, for example: the present condition of the equipment, features of the equipment type, environmental factors, customer's preferences, the planned usage profile.

Firstly, initial data may be centrally inputted to a simulation and optimization engine 316 of the computing system 312. The inputted initial data may include data retrieved from the databases 306, 308 and 310. Thus, the optimization into take into account following considerations, for example, the present condition of the equipment, the usage history of the equipment, features of the equipment type, environmental factors, customer's preferences, or the planned usage profile. More specifically, the customer-specific data may first be retrieved from the customer database 310, including the type of the equipment. Then, equipment-specific data may be retrieved from the historian database 306, and the equipment-type specific data may be retrieved from the database 308 based on the customer-specific data.

Figure 5:
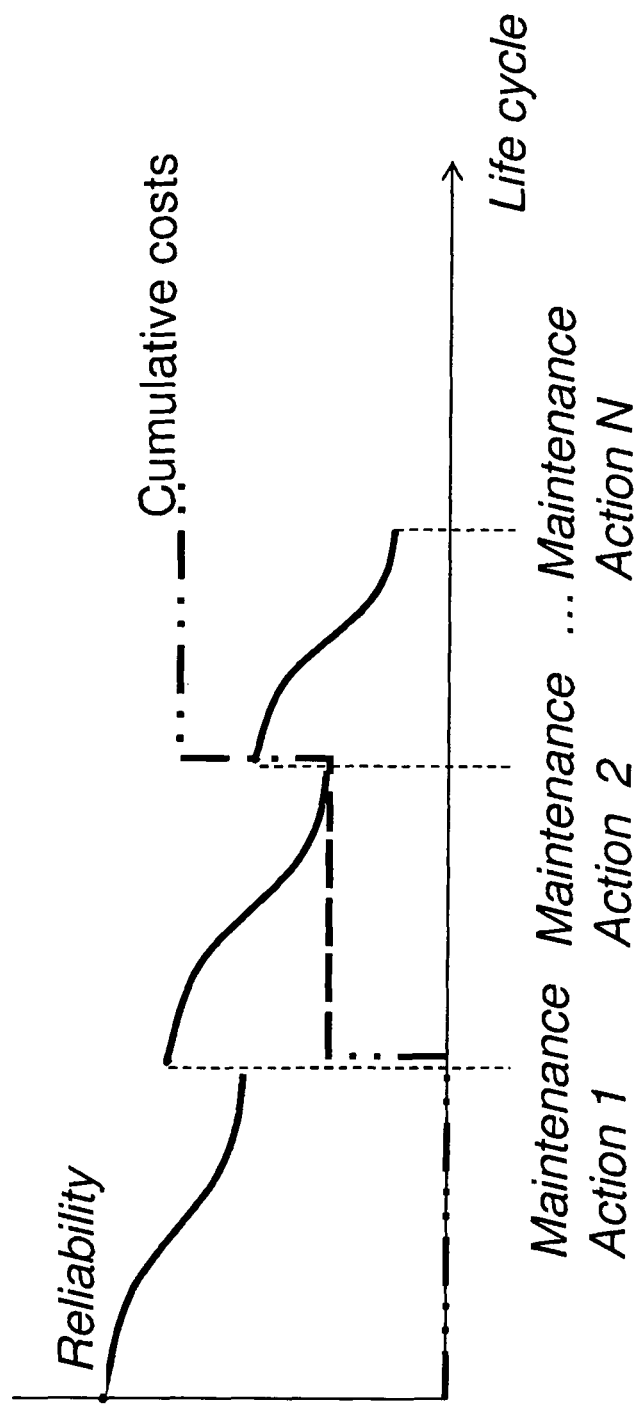
FIG. 5 illustrates estimated reliability and estimated cumulative costs for N consecutive maintenance actions scheduled over the future life cycle of the equipment.

Secondly, a simulation is used for estimating what is probably going to happen to the equipment based on the retrieved data. The simulation and optimization 316 allow a versatile view to the future life cycle of the equipment and to different alternative actions. This is illustrated in FIG. 5 in which the estimated reliability and the estimated cumulative costs are shown for N consecutive maintenance actions scheduled over the future life cycle of the equipment. A plurality of different potential scheduled maintenance actions may be considered, and effect of different maintenance actions and/or their combinations may be compared based on an estimated reliability, estimated maintenance cost and/or estimated safety of the specific equipment. The maintenance actions or combination of maintenance actions may be selected that provide the best compromise between the cost and reliability or safety. For example, if the consecutive maintenance actions that have cost and reliability shown in FIG. 5 are considered to gain the optimal result (e.g. best compromise between the cost and reliability), they may be selected as an optimized maintenance plan 402 shown in FIG. 4. Optionally, after computing the optimized maintenance plan 402 by the simulation and optimization engine 316, the maintenance plan 402 may be manually tuned (e.g. via a user interface 318 shown in FIG. 3), if required.

The obtained maintenance plan 402 may then be provided to the customer and/or the maintenance service provider. This may include that the optimized maintenance plan 402 is automatically inputted to an enterprise resource planning (ERP) system, such as system 320 shown in FIG. 3. The ERP may generate equipment-specific and component-specific maintenance tasks/actions 406 for the maintenance personnel. Thereby the optimized maintenance plan controls the everyday maintenance work.

Generally, the maintenance system according to example embodiments may be implemented in in hardware (one or more apparatuses), firmware (one or more apparatuses), software (one or more modules), or combinations thereof. For a firmware or software, implementation can be through modules (e.g., procedures, functions, and so on) that perform the functions described herein. The software or program codes may be stored in any suitable, processor/computer-readable data storage medium(s) or memory unit(s) or databases and executed by one or more processors/computers. The data storage medium or the memory unit, such as databases, may be implemented within the processor/computer or external to the processor/computer, in which case it can be communicatively coupled to the processor/computer via various means as is known in the art.

By merit of embodiments of the inventions, the transparency of the maintenance actions to the customer can be improved, as the maintenance needs and recommended actions can be predicted as accurately and systematically as possible. The centralized maintenance plan can be based on factual information and is not dependent on the subjective view or expertise of the maintenance person. Anyone can use the tool without need to know or be familiar with the target equipment to be optimized and its history. The optimized maintenance plan may optimize the productivity of the customer's equipment, because unplanned failures, breakdowns and shutdowns of cranes are avoided while production kept running. The optimized maintenance plan reduces downtime and enables manageable service breaks. The optimized maintenance plan reduces overall production costs and makes maintenance costs manageable and more predictable. Embodiments of the invention may further allow generating a theoretical reliability analysis for a specific moment of time.

It will be obvious to a person skilled in the art that, as the technology advances, the inventive concept can be implemented in various ways. The invention and its embodiments are not limited to the examples described above but may vary within the scope of the claims.

The invention claimed is:

1. A predictive maintenance method of hoisting equipment, comprising the steps of:
  receiving and automatically collecting, at a maintenance centre, diagnostic data relating to at least one component of a remote hoisting equipment;
  receiving and automatically collecting, at the maintenance centre, sensor data relating the operational environment of the remote hoisting equipment at least from a corrosion sensor and/or an accelerator sensor installed at the remote hoisting equipment, said data from the corrosion sensor comprising data representing a corrosive effect of the environment on electrical devices of the remote hoisting equipment and/or said data from the accelerator sensor comprising the data of external shocks to and collisions of the remote hoisting equipment;
  providing configuration data of the remote hoisting equipment;
  providing reliability data on said at least one component of the remote hoisting equipment; and
  automatically generating, based on said diagnostic data, configuration data, reliability data and said operational environment data, a maintenance plan optimizing the cost of maintenance and reliability of the hoisting equipment over a life cycle of the hoisting equipment.

2. The method as claimed in claim 1, wherein the automatically generating comprises the steps of:
  estimating a reliability and a maintenance cost of the remote hoisting equipment for a plurality of different combinations of maintenance actions and schedules; and
  selecting, among the plurality of combinations, the combination of maintenance actions and schedules that most probably optimizes the cost of maintenance and reliability of the remote hoisting equipment over a life cycle of the remote hoisting equipment.

3. The method as claimed in claim 1, wherein the automatically generating comprises the steps of:
  utilizing equipment-type-specific reliability data maintained based on historian data collected from a plurality of remote equipment; and
  utilizing the collected information to optimize a local maintenance of individual equipment.

4. The method as claimed in claim 1, wherein the selecting comprises the step of selecting the combination of maintenance actions that is estimated provide the best compromise between the cost and reliability or safety.

5. The method as claimed in claim 1, further comprising the step of, after automatically generating the optimized maintenance plan, manually tuning the maintenance plan.

6. The method as claimed in claim 1, comprising the step of maintaining in a database a customer-specific data that include one or more of configuration data of the remote equipment, types of the remote hoisting equipment, types of components of the remote hoisting equipment, customer preferences, designed usage profiles.

7. The method as claimed in claim 1, comprising the step of maintaining in a database equipment-type specific data that include parameters, features and/or reliability data for each type of equipment and/or component.

8. The method as claimed in claim 1, wherein the collected diagnostic data include operational, usage or condition data from the remote hoisting equipment.

9. The method as claimed in claim 8, wherein the operational, usage or condition data from the remote hoisting equipment is one or more of: hoist starts, hoist work cycles, hoist running hours, hoist loading data, hoist over-temperature occurrences, overloads, emergency stops, data on any occurrence where the performance limits of the remote hoisting equipment are exceeded.

10. The method as claimed in claim 1, wherein the sensor data relating to the operational environment of the remote hoisting equipment further include temperature and/or humidity.

11. The method as claimed in claim 1, wherein the accelerator sensor measures acceleration in three dimensions in x, y and z directions of a Cartesian coordinate axes.

12. The method as claimed in claim 1, comprising the step of taking the operational environment data into account in estimating the reliability of the remote hoisting equipment, at least if operation in an abnormal environment is observed.

13. A predictive maintenance system comprising at least one computer and at least one memory including computer program code, the at least one memory and the computer program code configured to, with the at least computer, cause a predictive maintenance of hoisting equipment, said predictive maintenance comprising:
  receiving and automatically collecting, at a maintenance centre, diagnostic data relating to at least one component of a remote hoisting equipment;
  receiving and automatically collecting, at the maintenance centre, sensor data relating the operational environment of the remote hoisting equipment at least from a corrosion sensor and/or an accelerator sensor installed at the remote hoisting equipment, said data from the corrosion sensor comprising data representing a corrosive effect of the environment on electrical devices of the remote hoisting equipment and/or said data from the accelerator sensor comprising the data of external shocks to and collisions of the remote hoisting equipment;
  providing configuration data of the remote hoisting equipment;
  providing reliability data on said at least one component of the remote hoisting equipment; and automatically generating, based on said diagnostic data, configuration data, reliability data and said operational environment data, a maintenance plan optimizing the cost of maintenance and reliability of the hoisting equipment over a life cycle of the hoisting equipment.

* * * * *